United States Patent
Bodnar (10) Patent No.: US 7,092,946 B2
(45) Date of Patent: Aug. 15, 2006

(54) SYSTEM AND METHODOLOGY FOR PROVIDING A MOBILE DEVICE WITH A NETWORK-BASED INTELLIGENT RESOURCE FORK

(75) Inventor: Eric Bodnar, Santa Cruz, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 61 days.

(21) Appl. No.: 10/308,595

(22) Filed: Dec. 2, 2002

(65) Prior Publication Data

US 2004/0107245 A1    Jun. 3, 2004

(51) Int. Cl.
G06F 17/30    (2006.01)
(52) U.S. Cl. ....................................... 707/10
(58) Field of Classification Search .................. 707/10, 707/104.1, 3, 513; 209/231; 359/25; 463/29; 705/14; 711/118, 161; 358/1.2
See application file for complete search history.

(56) References Cited

U.S. PATENT DOCUMENTS

| | | | |
|---|---|---|---|
| 6,070,228 A * | 5/2000 | Belknap et al. ............. | 711/118 |
| 6,345,298 B1 | 2/2002 | Moriya | |
| 6,441,920 B1 * | 8/2002 | Smith ........................ | 358/1.2 |
| 6,470,378 B1 | 10/2002 | Tracton et al. | |
| 6,792,575 B1 * | 9/2004 | Samaniego et al. ......... | 715/513 |
| 2001/0042170 A1 * | 11/2001 | Belknap et al. ............. | 711/118 |
| 2002/0078093 A1 * | 6/2002 | Samaniego et al. ......... | 707/513 |
| 2002/0166035 A1 * | 11/2002 | Belknap et al. ............. | 711/161 |
| 2003/0115099 A1 * | 6/2003 | Burns et al. .................. | 705/14 |

FOREIGN PATENT DOCUMENTS

WO    PCT/US/03/34227    10/2003

* cited by examiner

*Primary Examiner*—Diane D. Mizrahi
(74) *Attorney, Agent, or Firm*—Blakely, Sokoloff, Taylor & Zafman LLP; Judith A. Szepesi (57) ABSTRACT

An improved method for enumerating resources for use by a client is described. In an exemplary embodiment, the method includes method steps of: storing a source set of resources; receiving a request from the client for resources appropriate for the client; based at least in part on the request, determining a type for the client; based at least in part on the determined type, determining capabilities of the client; determining possible media types that may be derived from the source set of resources that are appropriate for the client; based on the possible media types and based on the set of resources, generating an extended set of resources; communicating the extended set of resources to the client; and processing requests from the client for access to resources from the extended set of resources.

57 Claims, 6 Drawing Sheets

SYSTEM AND METHODOLOGY FOR PROVIDING A MOBILE DEVICE WITH A NETWORK-BASED INTELLIGENT RESOURCE FORK

RELATED APPLICATIONS

The present application is related to the following commonly-owned application(s): pending application Ser. No. 10/273,670, filed Oct. 18, 2002, entitled "Imaging System Providing Dynamic Viewport Layering". The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to application resources (media) and, more particularly, to providing application resources to mobile devices and similar storage- and bandwidth-constrained environments.

2. Description of the Background Art

Today, with the wide availability of increasingly powerful mobile devices (e.g., graphics-enabled cellular telephones), there is much customer interest in mobile-based gaming. Despite that interest, a number of environmental differences exist today between mobile and gaming environments. For anything graphical in nature (which is the natural evolution for mobile gaming), an issue arises as to where, exactly, resources or "media" (e.g., bitmaps, icons, fonts, and the like) may be accessed. In the case of desktop PCs and home gaming consoles (e.g., Sony PlayStation), for example, systems have ready access to largecapacity storage, such as in the form of hard disk and/or CD ROM drives, that can easily supply the required graphical resources. Current mobile devices, on the other hand, do not have access to comparable storage facilities. Further, given that they connect wirelessly, mobile devices have a relatively limited amount of bandwidth available for downloading resources.

Additionally, the mobile environment does not benefit from the consistency found in the non-mobile space. For instance, every TV attached to a PlayStation console (i.e., non-mobile devices) is essentially the same—the resolution and signal are identical. Even in the PC environment, there is very little variation in screen differences. For instance, most PC monitors are full-color. Even though the screen resolution may change from one monitor to another, the aspect ratio remains constant. Thus, from the gaming perspective, PC monitors are essentially the same.

The cohesiveness exhibited by the PC environment has not translated well into the mobile environment. To begin with, significant variation in screen size exists among available mobile devices. Compounding the problem, a multitude of different aspect ratios can be found. For example, some mobile devices have square display screens, while others have rectangular ones. Further, there is a wide range of color capability found among available devices. Some devices are quite restrictive in the amount of color information that they can render. Even if a given mobile device is capable of rendering an image in fabulous color (with respect to the display hardware), current limitations in mobile device storage and communication bandwidth pose a problem as to how one could even deliver large-scale media to the device. At the same time, however, popular gaming platforms, such as PlayStation, owe much of their appeal to ready access to voluminous media.

In the wireless mobile gaming arena, the server suddenly becomes the main storage element for maintaining gaming media resources, as mobile devices tend not to have substantial storage capacity. Given that the server is the main storage element in a wireless environment and mobile devices have such varied capabilities (including not only physical capabilities, but also format compatibility capabilities), there is a need for a solution that supplies rich media to mobile devices so that the games are both consistent and appealing to customers.

It is instructive to briefly review how resources are currently handled for a related area, online gaming. In the case of PC-based online gaming, the basic approach has been to provide a single extensive download (e.g., multiple megabytes), which includes not only the game logic but also all of the resources associated with the game. In that environment, the only thing being communicated to the server is player location within the game so that position information of various characters (e.g., for a multi-arena game) may be shared with other players online. The actual game resources themselves are not being shared. A comparable situation exists for other (i.e., non-PC-based) online gaming environments. For example, using a PlayStation console for online gaming, players share position information, not actual game resources, with the online server.

The foregoing online approach to gaming may be slightly modified by creating different device-specific versions of a game. Then, the user is responsible for downloading the correct version of the game for the user's device. Palm device games are a good example of this. For example, many Palm games exist in color and monochromatic versions. Whether a particular download includes color or monochromatic icons, for example, depends on what version of Palm the download is targeting. Unfortunately, this modification requires the game developer to pre-generate all of the different versions that will be made available for download. Compromise often enters the process with game developers choosing to target the lowest common denominator platform, or target a relatively small set of target platforms.

This single "lump sum" download (or single large disk) approach works in the PC and console environments, given the minor amount of variation from one system to another. Thus, for example, the large download for a given game may include four or five variations of a given sprite (e.g., game character), but the extra overhead required is not particularly noticeable to the user of a PC (which has comparatively more resources available than a mobile device). Here, a single download will often include many resources that are (blindly) copied to the target machine but are not used or needed. Although these unused resources are unused data or resource "deadwood," they do not pose much of a problem given the substantial amount of local storage available on PC devices. In the mobile/wireless environment, devices are far more constricted in terms of available storage space, thus making the approach impractical.

However, constrained device-side storage capability is not the only reason that the "lump sum" approach is not suitable in the mobile environment. The amount of variation of required resources for targeting all of the available mobile devices is quite substantial when compared to the PC. For example, instead of, say, four or five variations of a given sprite, forty or fifty variations may be required. Further, users are often required to pay for the incremental bandwidth required for downloading games (e.g., byte-based charges), and thus users will not be receptive to paying for a bunch of unused resources (which of course would also need to be stored somewhere on the mobile device's limited storage). Given those constraints, it is not practical, in the mobile environment, to include (i.e., bundle in) that many variations of resources with an application.

What is needed is a more sensible approach to providing resources to applications, including improving the way downloadable games are provided to mobile devices. The present invention fulfills this and other needs.

GLOSSARY

The following definitions are offered for purposes of illustration, not limitation, in order to assist with understanding the discussion that follows.

HTML: Short for HyperText Markup Language, the authoring language used to create documents on the World Wide Web. HTML defines the structure and layout of a Web document by using a variety of tags and attributes. Tags are also used to specify hypertext links. These allow Web developers to direct users to other Web pages with only a click of the mouse on either an image or word(s).

HTTP: Short for HyperText Transfer Protocol, the underlying protocol used by the World Wide Web. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3), and is currently available via the Internet at http://www.w3.org/Protocols/.

JPEG: Full-size digital images are maintained in a Joint Photographic Experts Group or JPEG format. See e.g., Nelson, M. et al., "The Data Compression Book," Second Edition, Chapter 11: Lossy Graphics Compression (particularly at pp. 326–330), M&T Books, 1996. Also see e.g., "JPEG-like Image Compression" (Parts 1 and 2), Dr. Dobb's Journal, July 1995 and August 1995 respectively (available on CD ROM as Dr. Dobb's/CD Release 6 from Dr. Dobb's Journal of San Mateo, Calif.). The disclosures of the foregoing are hereby incorporated by reference.

Media (Resources): An application's media or resources include data that leads to some sort of human perception (i.e., sight, sound, touch, taste, and smell). Sight-based examples include icons, bitmaps, fonts, text strings, animation, and the like.

PNG: PNG (Portable Network Graphics) is a file format that uses lossless compression. PNG is a bit-mapped graphics format that can be used to create small, well-compressed images for Web display.

Sprite: A sprite is a graphic image, usually animated, that a user can interact with and move around.

SUMMARY OF THE INVENTION

An improved method for enumerating resources for use by a client is described. In an exemplary embodiment, the method includes method steps of: storing a source or base set of resources; receiving a request from the client for resources appropriate for the client; based at least in part on the request, determining a type for the client; based at least in part on the determined type, determining capabilities of the client; determining possible media types that may be derived from the source set of resources that are appropriate for the client; based on the possible media types and based on the set of resources, generating an extended set of resources; communicating the extended set of resources to the client; and processing requests from the client for access to resources from the extended set of resources.

DETAILED DESCRIPTION OF A PREFERRED EMBODIMENT

The following description will focus on the presently preferred embodiment of the present invention, which is implemented in a mobile (e.g., wireless) environment with Internet connectivity (e.g., to Web-based server computers). The present invention, however, is not limited to any one particular application or any particular environment. Instead, those skilled in the art will find that the system and methods of the present invention may be advantageously embodied on a variety of different platforms. Therefore, the description of the exemplary embodiments that follows is for purposes of illustration and not limitation.

I. Computer-Based Implementation

A. Basic System Hardware (e.g., for Desktop, Handheld, and Server Computers)

Figure 1:
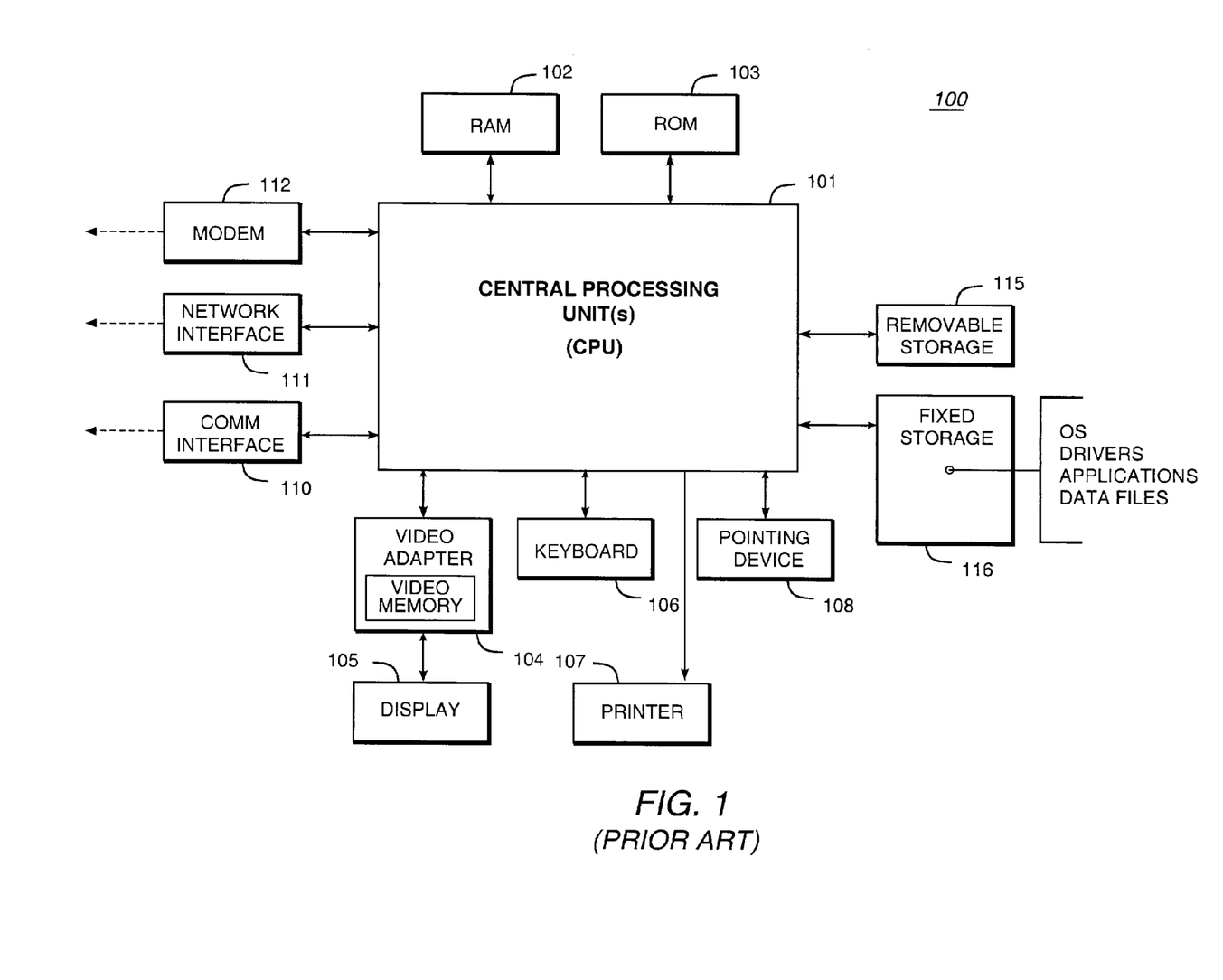
FIG. 1 is a block diagram of a computer system in which software-implemented processes of the present invention may be embodied.

Operations of the present invention described below may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers, handheld computers, and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
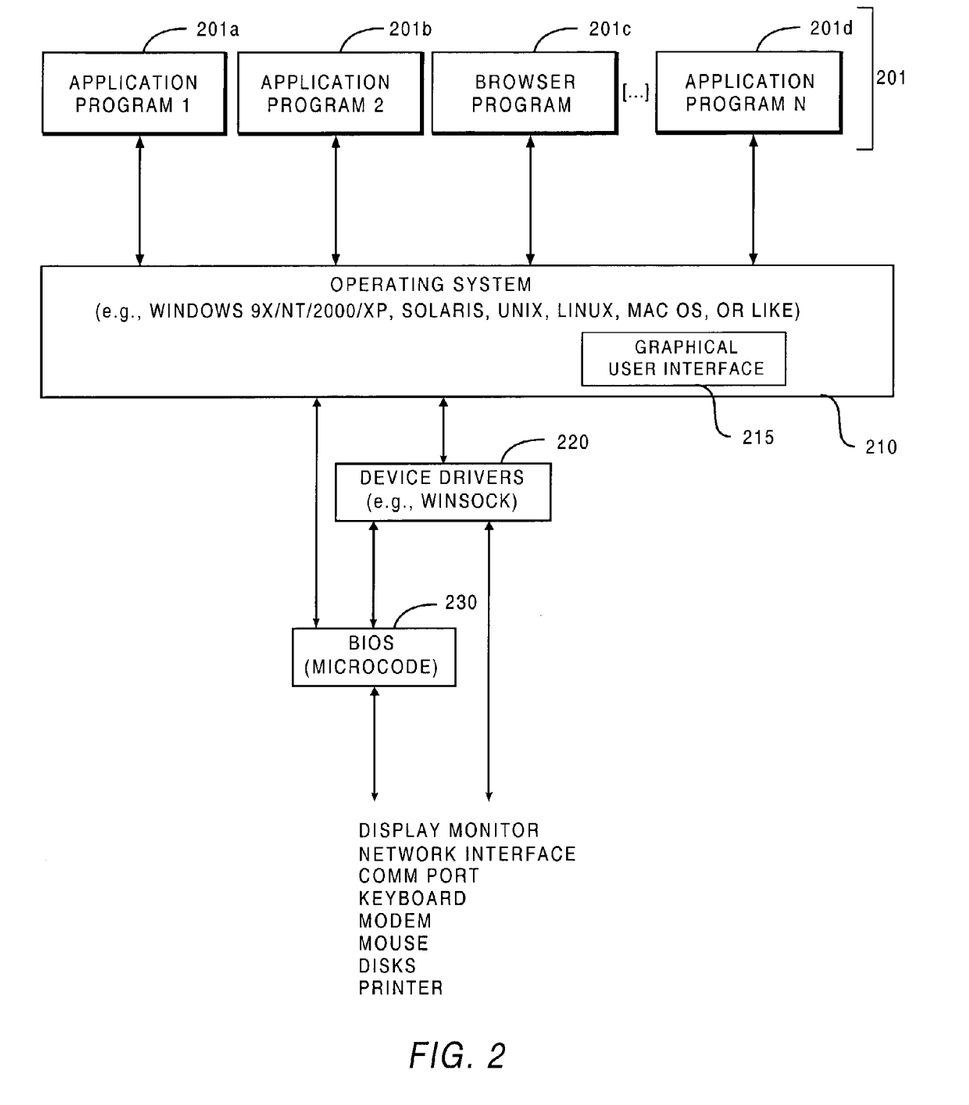
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9×, Microsoft® Windows NT, Microsoft® Windows 2000, Microsoft® Pocket PC, and Microsoft® Windows XP, all available from Microsoft Corporation of Redmond, Wash. Alternatively, OS 210 can also be an alternative operating system, such as the Palm OS for handheld computers.

The above-described computer hardware and software are presented for purposes of illustrating the basic underlying desktop, handheld, and server computer components that may be employed for implementing the present invention.

For purposes of discussion, the following description will present examples in which it will be assumed that there exists a portable handheld "mobile" computing device that may connected (e.g., wirelessly) to a "server" computer (e.g., Web server). The mobile device will, at times, be referred to as the "target" device or "client" device. The present invention, however, is not limited to any particular environment or device configuration. In particular, a client/server or target/server distinction is not necessary to the invention, but is used to provide a framework for discussion. Instead, the present invention may be implemented in any type of system architecture or processing environment capable of supporting the methodologies of the present invention presented in detail below.

II. Providing a Mobile Device with a Network-Based Intelligent Resource Fork

A. Overview

The basic approach adopted by the present invention is to consider a game's media (resources) to be separate from the game's logic and to solve the problem of storing that media by employing an online storage resource (e.g., server-based storage). First, the game logic itself should preferably be provided to the target devices in a portable fashion. For example, game logic coded in Java is straightforward to ship to a variety of different target devices. Second, each target device itself has remote access to the particular resources that are required to render the game on that particular device. Each device may demand resources based on its own specific profile or need. With such an approach, an appropriate resource fork is effectively bound to the application on the fly. In this manner, each target device is efficiently provided with resources appropriate for its own need, without dumping unneeded resources on the device and without compromising the richness of resources provided to the device.

Since with this approach the media will be accessed remotely, the present invention includes a methodology that dynamically tunes the media while en route from the storage device to a given target (client) device, so that the media is optimized for the capabilities of the target device. In one embodiment, the media is stored at a single location (e.g., server computer). However, the embodiment may be extended to incorporate a variety of different locations for storing the media. By taking advantage of a device's online connectivity, the present invention is able to provide that device with rich media storage. Further, the user is freed from the inconvenience of having to select from a number of variations of the media. Additionally, the developer is freed from the inconvenience of having to maintain a massive number of variations of the media just to support the different target devices available.

B. Exemplary Deployment

Figure 3:
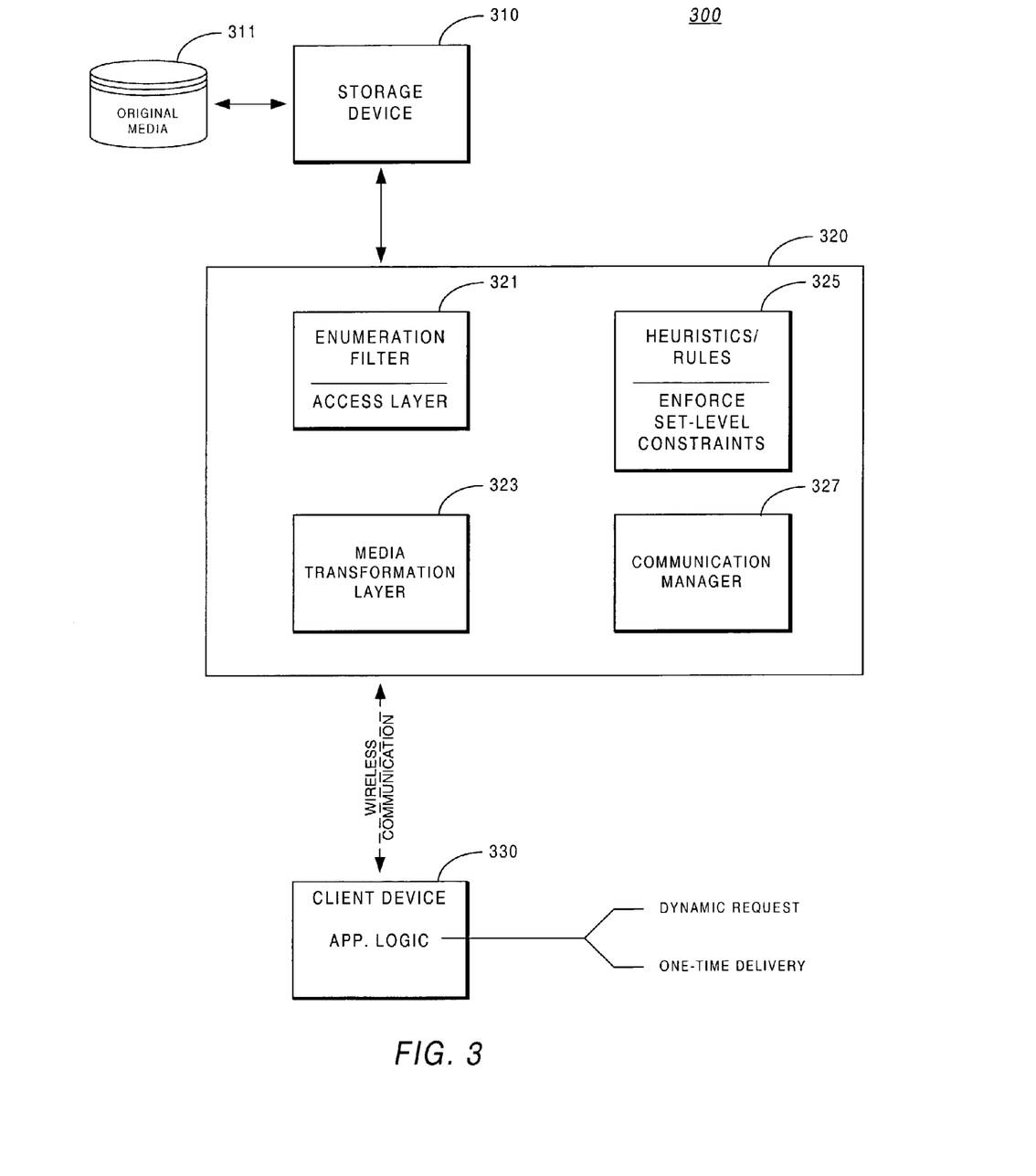
FIG. 3 is a high-level block diagram illustrating an exemplary system or deployment constructed in accordance with the present invention.

FIG. 3 is a high-level block diagram illustrating an exemplary system or deployment 300 constructed in accordance with the present invention. As shown, the deployment includes a storage device 310, storing (original) media 311 (source or base resource set), a resource management module 320, and client (target) device(s) 330. The resource management module 320 includes an enumeration filter/access layer 321, a media transformation layer 323, a heuristics/rules layer 325, and a process/communication manager 327. Thus, at the highest level, interaction occurs between the storage device 310, the resource management module 320, and a given client device 330, with the communication being coordinated by the communication manager 327. Operation of the components of the deployment 300 will now be described in greater detail.

The storage device 310 ("storage") serves as a repository that stores the original media 311. Apart from the original media, the deployment 300 may provide a virtual representation of the original media (archive) based on the capabilities of a given target device. The enumeration filter/access layer 321 of the resource management module 320 provides this functionality. Suppose, for example, that the storage 310 included a set of JPEG (Joint Photographic Experts Group) bitmaps as the original media. A derived repository or "resource fork" may be created by the access layer 321 to provide a virtual representation of those bitmaps as a list of the GIF images (e.g., based on the capability of a given target device that can only handle GIF images). The access layer 321 allows the resource management module 320 to enumerate/list the media that is available. However, the access layer 321 also acts as a filter in that it will not deliver a result that is unusable (by a given client device). Thus, the access layer 321 has the responsibility of representing the media's hierarchy (and nature of media elements therein) in such a way that would be acceptable by the target device.

The media transformation layer 323 does the actual work of transforming the media (if necessary) from its original representation/format/style in the storage (storage 310) to the representation/format/style required by the (then-current) target device. Thus, the transformation layer 323 has the responsibility of performing color or tonal reducing, changing formats, adjusting compression, or the like, as required to achieve appropriate delivery of the media to the particular target device.

Each individual media element is atomic but also has a relationship to other media elements. Consider, for example, a videogame that has a background screen that is overlaid with different sprites. All of the elements must be rendered cohesively for the given target device, both with respect to color format and resolution. Therefore, in accordance with the present invention, the resource management module 320 includes the heuristics/rules layer 325 to enforce set-level or interdependent constraints. Here, the rules layer 325 deals with the media as a set. It examines the constraints for a given target device and then instructs the transformation layer 323 specifically how to transform interdependent elements (e.g., background screen and sprites) as a set, so that those elements work together cohesively. Therefore, if any sprite is changed in size, other (interdependent) resource elements are also changed in size. Or if a given element is palette reduced, then other interdependent resource elements are also palette reduced, so that the elements may be rendered with the same palette (i.e., without having to perform palette switching).

The client device 330 represents a particular target device (e.g., handheld wireless device) that is currently being serviced by the deployment. As illustrated, the application logic itself at the client device 330 exists separate from the resources. As a result, the application logic can be delivered "as is" from storage (e.g., storage 310). Delivery of the resources themselves can be driven by the application logic (i.e., the application logic requests resources dynamically). Alternatively, a separate process may bind the (modified) resources to an otherwise unmodified copy of the application logic, with the two then being delivered to the client device as a one-time deliverable (i.e., single packet). In the latter case, the one-time deliverable appears to be a more traditional download, except however that the deliverable is dynamically generated based on the capabilities/constraints of the then-current client device. This allows the developer to avoid compiling a number of different versions for downloading by different client devices.

C. Binding of Resources

At a high level, the task is to deliver the media as a "resource fork" of the application. Here, the media represents the application's resource bundle, which is separate from the application's logic. Different delivery methods are available. In a first delivery method, for example, the application logic is delivered first to the device, and as the application needs its various resources, it dynamically requests them. At the time that the application makes its request, it announces the target device's capabilities. The application logic and resource requests allow the application to group resources into sets. Here, even though the application may only request a particular media item out of the set of resource items, the rules by which the media is transformed are applied uniformly (i.e., behave consistently) across that set.

In the second delivery method, the application logic and media are bundled together before delivery to the target device. In other words, a resource binding process is applied before downloading the application to the target device. Depending on the implementation of the target device, the binding can be something as simple as delivering two packages together (e.g., executable file with accompanying resource-only file). Or, with a more complicated target device (e.g., Windows client), an executable without any resources can be combined with appropriate resources using a separate binding application, to generate an executable with bound resources. In this case, the resources may be combined with the executable into a single file, or the resources may be maintained as a separate file that is "bound" to the executable (e.g., such as a Windows resource-only DLL file that is bound to an executable file).

Those skilled in the art will appreciate that other delivery methods are available that benefit from the approach of the present invention of deploying target device-specific resources in an optimized manner. Regardless of delivery method, the resources may remain persistently at the client device or, if desired, the resources may be discarded after use (e.g., after an application session). In the latter case, a copy of the downloaded resources may be cached (e.g., at the server), as desired.

D. Example: Mobile Pac Man Game

Pac Man is a well-known game that may serve to illustrate the foregoing principles. In Pac Man, the game consists of a background maze and a set of sprites, for a given level of the game. The maze is a background resource. The sprites are foreground resources used to represent the Pac Man characters, the fruit, and the ghosts. These resource elements (i.e., maze plus sprites) bundled together for a particular level of the game may be considered a resource set. Another level of the game would have a different set, since the game's screen display is refreshed with a different maze and different sprites as the game player advances from one level to the next.

The underlying Pac Man application needs access to the appropriate set for a given screen (level). Therefore, it would be helpful if all of the resources were enumerated in a manner that facilitated access, such as the resource hierarchy illustrated in FIG. 4. The actual technique itself for enumerating the resources (e.g., as a set of files, as a database access/resource, or the like) is not particularly important to the overall approach, so long as each individual resource is identifiable (e.g., "Pac Man", "fruit", or the like). In the case of a sprite, there are multiple elements that make up the sprite. For example, a sprite may include a color layer and a transparency layer.

Figure 4:
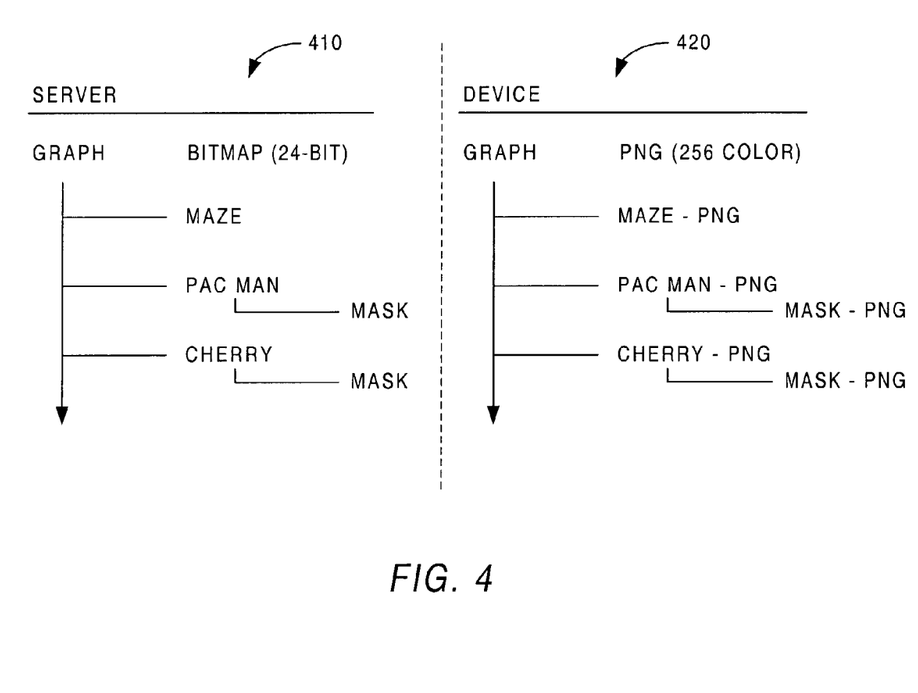
FIG. 4 is a diagram illustrating hierarchical representation of resources, including virtual representation of resources that do not yet exist (but may be created using image transformation process).

As shown in FIG. 4, for example, the "level 1" set of original media may be represented by hierarchy 410. The developer created the original media at a certain resolution, for example at high-resolution in a rich color set (e.g., 24-bit color). Further, the developer created the resources as individual bitmaps, for example, bitmaps for each color background (maze), bitmaps for each sprite's color layer, and bitmaps for each sprite's transparency layer.

Consider a target device that can only accept bitmaps in the PNG format, with 8-bit (256) colors. Suppose the application, while running on the device, requested that "level 1" resources be enumerated. Given the device's capabilities and the set of available resources for "level 1," the communication manager 327 can discern that the resources need to be presented to the client device as a directory of PNG bitmaps (even though those PNGs do not presently exist). The enumeration filter/access layer 321 provides this enumeration, which is illustrated by hierarchy 420 in FIG. 4.

The heuristics/rules layer 325 lends additional intelligence to the process. For example, PNG is a format capable of having a transparency, whereas a (generic) bitmap is not. Therefore, the heuristics/rules layer 325 can combine the Pac Man color layer and transparency layer into a single PNG resource. As the foregoing example illustrates, application of heuristics from the heuristics/rules layer 325 may actually cause the number of derived resources to be different than the number of original resources.

After the client device receives the proper enumeration of (virtual) resources, the client device may proceed to request delivery of those resources. At that point, the media transformation layer 323 may be invoked to perform actual on-the-fly transformations. The transformation is performed while observing set-level constraints. In the foregoing example of taking a 24-bit color resource down to 8-bit color, the media transformation module examines the other media in the set before performing palette reduction. The palette reduction will be based on the entire set, not just a particular item requested from the set. A set represents items that can be co-rendered. Therefore, if there is a single palette in use, one cannot have a multitude of co-rendered items with mismatched palettes. Although individual items may be delivered separately, and at different times, items in a set may be co-rendered and thus must coexist cohesively on the client device screen so that they do not collide visually. Besides palette, aspect ratio represents another characteristic that can define a set. For example, if aspect ratio were based on a single rectangular sprite, the other elements in the set must comply with that aspect ratio in order to correctly render the items as a cohesive set. In general, anything in the set has to be treated as a whole, even though the particular elements within a set may be delivered individually.

Consider, for example, the following sequence. In response to the game application's request for the maze for level 1, the resource management module scans the set that the requested elements reside in, that is, the set of resources for level 1. The resource management module determines how many colors need to be represented for the set, and then determines how many colors it will dedicate for rendering the maze. This information is provided as input to the transformation layer, together with a request that the transformation layer transform the (requested) maze. In response, the transformation layer transforms the maze, such as from 24-bit true color bitmap into a reduced-palette PNG image with maximum of 256 colors. At this point, the resource management module may hold in reserve a number of palette colors for images that have yet to be downloaded. Alternatively, one may generate a "set-based" palette that encompasses all of the images in the "set" and match all resources to the set to that palette. Other elements of the set may then be retrieved. Upon retrieval of the Pac Man character for level 1, the resource management module will recognize that the character (sprite) is being retrieved from the same set (i.e., level 1 set). Therefore, it may transform the sprite using the same transformation (i.e., reduced-palette PNG). Also, applying heuristics, the resource management module may merge the sprite's color layer and transparency layer into a single PNG having a transparency layer, which is then delivered to the target device.

The heuristics may be created using coded logic and supporting data designed to deal with known formats (of which there are a limited number of media types). In this manner, the heuristics can aid the transformation process based on the specific capabilities of a given media type. The heuristics are configurable in a manner that affects the transformation process's ability to exploit a given capability of a media type. For example, if a developer did not want the color layer and the transparency layer of a bitmap combined into a single PNG, the developer may configure the system to override the combination. In this fashion, the developer can configure the system to apply rules based on developer-specified conditions.

E. Summary of Operation

Figure 5A:
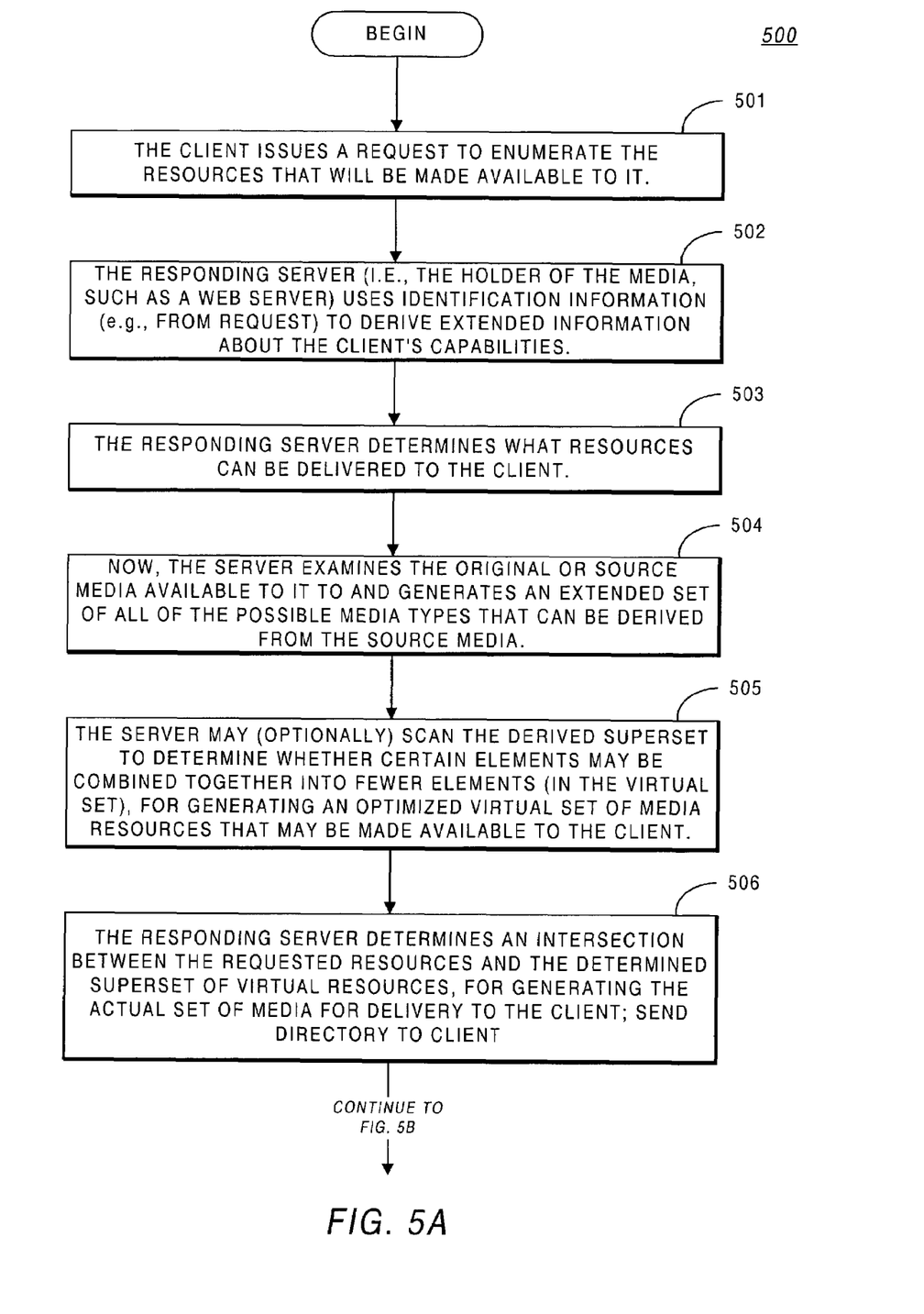
FIGS. 5A–B comprise a single high-level flowchart illustrating basic operation of the method of the present invention.
Figure 5B:
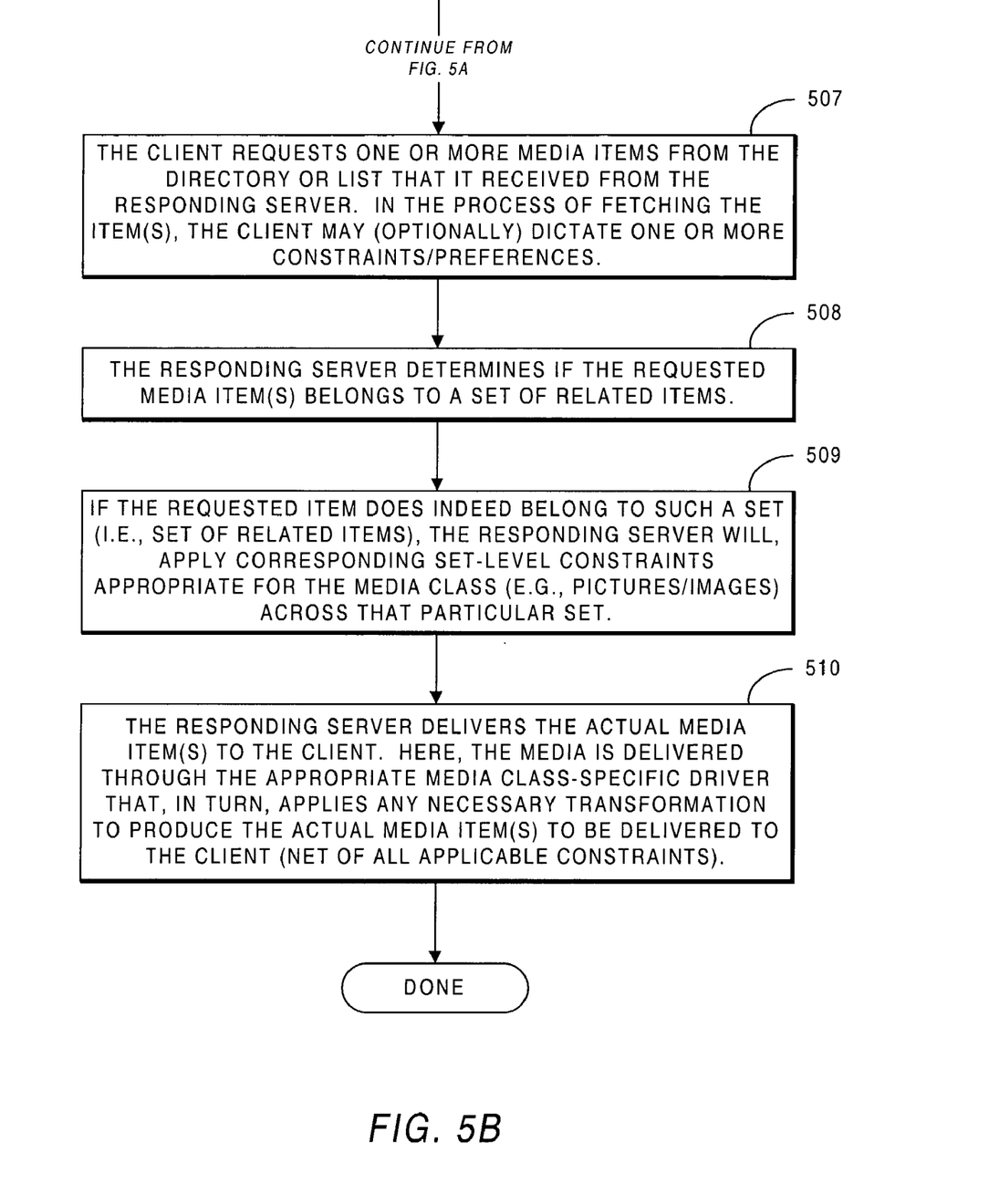

FIGS. 5A–B comprise a single high-level flowchart illustrating basic operation of the method of the present invention. In a typical deployment, each client will be at a remote location relative to the resources, and the clients will have a lot of variance in their capabilities for processing resources. Although the foregoing scenario is common among mobile devices (clients), the method of the present invention itself is by no means restricted to mobile devices. The method steps described below may be implemented using computerexecutable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Given a set of resources in storage and a client that wants access to those resources, the method of the present invention operates as follows. First, the client issues a request to enumerate the resources that will be made available to it, as shown at step 501. The request will include (directly or indirectly) some indication that will aid in the determination of what type of device the client is, such as browser version, model number, device capabilities, or the like. For example, for an i-Mode phone (available from NTT DoCoMo of Japan) as the client device, the request received from the phone may include a particular model number. As another example, the information may be transmitted as an attribute field as part of an HTTP GET request. In that instance, a browser request received from a (browser) client includes an HTTP GET command comprising the URL plus a header identifying client browser type. The method of the present intention is, however, independent of any particular bearer of the information. For instance, operation of the method of the present invention is largely unchanged whether the foregoing information is transmitted via HTTP, via Bluetooth, via wireless CDMA, or the like.

At step 502, the responding server (i.e., the holder of the media, such as a Web server) uses the identification information to derive extended information about the client's capabilities. For example, the client's model number may be used to look up the client's capabilities in a device capabilities database. (For additional description of an exemplary device capabilities database, see, e.g., the above referenced, commonly owned pending U.S. application Ser. No. 10/273, 670). Based on the information about client capabilities determined at step 502, the responding server determines what resources (i.e., media) can be delivered to the client at step 503. Now, at step 504, the server examines the original or source media available to it to generate an extended set of all of the possible media types that can be derived from the source media—that is, a virtual set of all of the possible media types (that may be derived). For example, given a list of bitmap (BMP) files, the server could generate a virtual set that also includes an equivalent list of JPEGs, an equivalent list of PNGs, and so forth and so on.

In the currently preferred embodiment, the responding server includes a collection of drivers supporting different media types. Each driver can translate to and from a particular media type (e.g., JPEG driver for JPEG media type). The drivers are organized by class of media type. Representative classes include audio, text, picture, and animation, for example. Within each class, there exist a number of input/output drivers, each of which supports importing into and exporting from its respective class. Given a client request for a particular class of objects (e.g., picture) and the server's determination of client capabilities, the server may invoke corresponding drivers. In response to this invocation, relevant drivers announce themselves as appropriate for servicing the client request, thereby producing assets of compatible formats for the requested class. The net result is that given a fixed set of original or source media, the responding server generates a virtual set or superset of media that may be derived (e.g., via transformation).

As an optional step, the server may examine the virtual set of media for determining whether convergence should be applied. Some formats are aggregates of other formats. For example, in bitmap (BMP) format, a color plane and a mask are represented as two distinct elements, that is, two separate bitmaps. However, in other formats (e.g., PNG and JPEG), the mask may be encoded as an alpha channel within a single element. As another example, a sequence of enumerated frames (e.g., BMPs) could be combined together into a single element having a media type that supports animation (e.g., AVI). As yet another example, separate left and right audio feeds could be combined together into a single element having a media type that supports two (stereo) channels (e.g., MP3). Therefore, at (optional) step 505, the server may scan the derived virtual set (superset) to determine whether certain elements may be combined together into fewer elements (in the virtual set), for generating an optimized virtual set of media resources that may be made available to the client. In the currently preferred embodiment, heuristics employed for convergence are embodied in the respective drivers (i.e., each driver embodies program logic and supporting data structures necessary for applying convergence). Therefore, each responding driver indicates whether it is able to reduce the set by applying convergence to its particular media type.

At step 506, the responding server determines an intersection between the requested resources and the determined superset of virtual resources, for generating the actual set of media for delivery to the client. The device capability of the client may include support for more than one equivalent format (e.g., support for both JPEG and PNG pictures). Therefore, in the currently preferred embodiment, intersection is prioritized based on client device preference. The preference may be indicated locally (e.g., by the client device) and/or remotely (e.g., by heuristics embodied in the drivers, by the device capabilities database, or the like), so that the responding server can determine which of the available equivalents is preferred. Alternatively, the intersection may comprise a plain intersection that includes all equivalents (i.e., allow multiple representations of a given media resource item). In typical application, it will often be most practical to produce the ideal minimal set (i.e., allow only one representation of a given media resource item). The determined intersection is delivered to the client as a directory (list) of media resources available to that client. It will be appreciated that the response to the client's request for media resources may look very different from the underlying original or source media resources. At this point, in the currently preferred embodiment, the resources listed are still virtual (i.e., they have not yet been physically rendered).

At step 507, the client requests one or more media items from the directory or list that it received from the responding server. In the process of fetching the item(s), the client may (optionally) dictate one or more constraints/preferences. For example, the client may specify that pictures (images) be constrained to have a particular maximum/minimum bit depth, or a maximum/minimum resolution, or maximum/minimum dimensions, or a maximum file size, and so forth. This represents an optional, on-the-fly specification of additional constraints/preferences at the time of fetching resource items.

At step 508, the responding server determines if the requested media item(s) belongs to a set of related items (related group). In the example of a Pac Man game, the enumeration of resources in step 504 included enumeration of resources for all levels of the game. However, the request for a specific media item (e.g., for game level 1) entails a request for an item (e.g., character sprite) that belongs to a set of related items (e.g., all bitmaps for game level 1).

If the requested item does indeed belong to such a group or set (i.e., set of related items), the responding server will, at step 509, apply corresponding set-level or group-wide constraints appropriate for the media class (e.g., pictures/images) across that particular group. In the instance of bitmaps for a particular game level, for example, the responding server may constrain those bitmaps to share a common palette (as it is likely that those elements may appear on screen together). In the instance of related audio clips or files, the responding server may constrain those clips to share a common sampling rate (e.g., 8 kHz), even if the underlying source media did not share a common sampling rate. Thus, when subsequent related items are fetched, they will already be pre-constrained in a manner that is compatible with the already-requested item. As an optimization to the method, the server may bring related items into (cache) memory, as it is likely that the client's subsequent requests will include fetching those related items.

At step 510, the responding server delivers the actual media item(s) to the client. Here, the media is delivered through the appropriate media class-specific driver that, in turn, applies any necessary transformation to produce the actual media item(s) to be delivered to the client (net of all applicable constraints). For example, the responding server may invoke a PNG driver to transform an underlying source bitmap(s) into PNG format. During this transformation process, the PNG format of the requested item that is generated may be constrained to a palette that matches other related items in the same set. The end result is that the client receives a media item that (1) is capable of being correctly processed by the client, (2) is constrained in a manner requested by the client, and (3) is constrained in a manner that is consistent with other items that are related to the requested item. The method may loop back for processing additional requests from the client for other items. The method may conclude upon receiving an explicit termination from the client or, in the preferred embodiment, the method operates in a stateless fashion to simply revert to an idle state where it listens for new incoming requests.

The foregoing discussion has focused on the scenario where the client includes an application (e.g., running on a remote client) fetching the media. However, the present invention is also applicable in the scenario where the application fetching the media is a precompiler. Here, the precompiler enumerates/fetches all of the media items (for a given version of the application) as if it were the client, and then proceeds to bind those resulting media items with the application (e.g., within a resource file, resource fork, or other resource binding mechanism). The precompiler takes into account the particular target device where the application is to be deployed so that appropriate resources are bound. The application with its just-bound resources is then delivered for deployment to the particular target device. Therefore, the above described method may respond to a request for run-time binding of resources, or it may respond to a request for precompile binding of resources.

While the invention is described in some detail with specific reference to a singlepreferred embodiment and certain alternatives, there is no intent to limit the invention to that particular embodiment or those specific alternatives. For example, the use of game applications is illustrative. However, application of the present invention is not limited to games. Any application that relies on device-specific resources (e.g., graphical, audio, or the like) can benefit. Therefore, those skilled in the art will appreciate that modifications may be made to the preferred embodiment without departing from the teachings of the present invention.

What is claimed is:

1. A computer-based method comprising:
   receiving, at a server computer system, an initial request from a client for information about resources available for access, wherein the client is an electronic device;
   automatically applying convergence to the extended said of resources in instances where resources may be combined together into fewer resources;
   based at least in part on said possible media types and said source set of resources, determining an extended set of resources for the client;
   automatically communicating information about the extended set of resources to the client; and
   processing subsequent requests from the client for access to resources from said extended set of resources.

2. The method of claim 1, wherein the client is located remotely from the source set of resources.

3. The method of claim 1, wherein the resources are maintained by a server.

4. The method of claim 1, wherein said initial request from the client is received by a server with Internet connectivity.

5. The method of claim 4, wherein said server controls the source set of resources.

6. The method of claim 1, wherein said initial request from the client originates from a browser operating at the client.

7. The method of claim 1, wherein said initial request comprises an HTML request.

8. The method of claim 7, wherein said HTML request includes client identification information.

9. The method of claim 1, wherein said source set of resources includes bitmap resources.

10. The method of claim 1, wherein said source set of resources includes audio resources.

11. The method of claim 1, wherein said source set of resources includes text resources.

12. The method of claim 1, wherein said step of determining possible media types appropriate for the client includes:
consulting a device capabilities database for determining particular capabilities of the client.

13. The method of claim 12, wherein said device capabilities database is at a remote location from the client.

14. The method of claim 1, wherein said step of determining possible media types appropriate for the client includes:
using a model number of the client to look up device capability information for the client.

15. The method of claim 14, wherein said model number is transmitted as part of said initial request.

16. The method of claim 1, wherein said step of determining possible media types includes:
determining a virtual set of possible media types that are appropriate for the client.

17. The method of claim 16, wherein said virtual set comprises a superset of resources that includes media types into which resources from the source set may be transformed.

18. The method of claim 17, wherein said virtual set includes at least one image format that may be derived from an image format in the source set of resources.

19. The method of claim 18, wherein at least one image format is derived from an image format in the source set of resources using an image transformation.

20. The method of claim 19, wherein said image transformation includes transforming from a non-JPEG format to a JPEG-compatible format.

21. The method of claim 19, wherein said image transformation includes transforming from one bitmap format to another.

22. The method of claim 1, wherein said step of determining an extended set of resources includes:
determining an intersection between the source set of resources and said possible media types.

23. The method of claim 22, further comprising:
specifying preferred media types for the client; and
constraining the extended set of resources to only include preferred media types for the client.

24. The method of claim 23, wherein preferred media types for the client are specified by the client when requesting access to resources.

25. The method of claim 23, wherein preferred media types for the client are specified by a device capabilities database.

26. The method of claim 23, wherein preferred media types for the client are specified by a server that receives requests from the client.

27. The method of claim 26, wherein preferred media types for the client are specified at the time the client requests access to a particular resource from the extended set of resources.

28. The method of claim 1, wherein the client includes a mobile device running application software.

29. The method of claim 1, wherein the client includes a precompiler that binds resources to an application.

30. The method of claim 1, further comprising:
upon receipt of a request for access to a resource, determining whether the resource belongs to a related group of resources; and
if the resource belongs to a related group of resources, enforcing a group-wide constraint on the resources.

31. The method of claim 30, wherein said group-wide constraint includes constraining resources belonging to the group to share a common palette.

32. The method of claim 1, wherein said step of determining possible media types appropriate for the client includes:
based at least in part on the request, determining a type for the client; and
based at least in part on the determined type, determining capabilities of the client.

33. The method of claim 32, wherein said type comprises a device type.

34. The method of claim 32, wherein said type comprises a browser type.

35. A computer-readable medium having processor-executable instructions for performing the method of claim 1.

36. A downloadable set of processor-executable instructions for performing the method of claim 1.

37. A computer-based method comprising:
receiving, at a server computer system, an initial request from a client for information about resources available for access, wherein the client is an electronic device;
automatically determining possible media types appropriate for the client that may be derived from a source set of resources:
based at least in part on said possible media types and said source set of resources, determining an extended set of resources for the client:
automatically communicating information about the extended set of resources to the client; and
upon receiving a request from the client for access to a resource from said extended set of resources, creating the resource by transforming one of the resources from the source set of resources into a resource having a media type appropriate for the client.

38. The method of claim 37, wherein said initial request comprises an HTML request.

39. The method of claim 37, wherein said source set of resources includes bitmap resources.

40. The method of claim 37, wherein said step of determining possible media types appropriate for the client includes:
consulting a device capabilities database for determining particular capabilities of the client.

41. The method of claim 37, wherein said step of determining possible media types includes:
determining a virtual set of possible media types that are appropriate for the client.

42. The method of claim 37, wherein said step of determining an extended set of resources includes:
determining an intersection between the source set of resources and said possible media types.

43. The method of claim 37, wherein the client includes a mobile device running application software.

44. The method of claim 37, wherein the client includes a precompiler that binds resources to an application.

45. The method of claim 37, further comprising:
upon receipt of a request for access to a resource, determining whether the resource belongs to a related group of resources; and
if the resource belongs to a related group of resources, enforcing a group-wide constraint on the resources.

46. A computer-readable medium having processor-executable instructions for performing the method of claim 37.

47. A computer-based method comprising:
receiving, at a server computer system, an initial request from a client for information about resources available for access, wherein the client is an electronic device;
automatically determining possible media types appropriate for the client that may be derived from a source set of resources;
based at least in part on said possible media types and said source set of resources, determining an extended set of resources for the client;
automatically transmitting a directory of virtual resources to the client; and
processing subsequent requests from the client for access to resources from said extended set of resources.

48. The method of claim 47, wherein said client is unaware that the resources indicated on the directory are derived from the source set of resources.

49. The method of claim 47, wherein said initial request comprises an HTML request.

50. The method of claim 47, wherein said source set of resources includes bitmap resources.

51. The method of claim 47, wherein said step of determining possible media types appropriate for the client includes:
consulting a device capabilities database for determining particular capabilities of the client.

52. The method of claim 47, wherein said step of determining possible media types includes:
determining a virtual set of possible media types that are appropriate for the client.

53. The method of claim 47, wherein said step of determining an extended set of resources includes:
determining an intersection between the source set of resources and said possible media types.

54. The method of claim 47, wherein the client includes a mobile device running application software.

55. The method of claim 47, wherein the client includes a precompiler that binds resources to an application.

56. The method of claim 47, further comprising:
upon receipt of a request for access to a resource, determining whether the resource belongs to a related group of resources; and
if the resource belongs to a related group of resources, enforcing a group-wide constraint on the resources.

57. A computer-readable medium having processor-executable instructions for performing the method of claim 47.

* * * * *